United States Patent Office 3,530,052
Patented Sept. 22, 1970

3,530,052
FLUORINE PURIFICATION
Charles T. Goetschel and Vincent A. Campanile, Walnut Creek, Calif., assignors to Shell Oil Company, New York, N.Y., a corporation of Delaware
No Drawing. Filed June 22, 1967, Ser. No. 647,946
Int. Cl. B01j 1/10
U.S. Cl. 204—157.1                            3 Claims

ABSTRACT OF THE DISCLOSURE

Oxygen present in liquid fluorine is converted to dioxygen difluoride by irradiating oxygen-containing liquid fluorine, and relatively pure fluorine is removed from the resulting mixture in the vapor phase.

BACKGROUND OF THE INVENTION

Commercially available fluorine invariably contains a small proportion of elemental oxygen, typically about 1% mole, the removal of which is difficult because of the similarity in the physical properties of oxygen and fluorine and because of the greater chemical reactivity of the fluorine which virtually precludes any simple method of chemical separation. Yet, the presence of the oxygen is disadvantageous, as the impurity is in itself highly reactive and offers a hazard during handling and utilization of the fluorine.

It is known that oxygen and fluorine can be chemically combined by passing gaseous mixtures of fluorine and oxygen through a high voltage electrical discharge at low temperatures and low pressures. See, for example, Ruff et al., Z. Anorg. Chem., 211, 204 (1933), who produce dioxygen difluoride in this manner. As the procedure is limited to gaseous materials which are at low pressure, the technique does not afford a practical method for producing any sizable amount of dioxygen difluoride or for reducing the oxygen content of relatively large portions of fluorine.

SUMMARY OF THE INVENTION

It has now been found that irradiation of oxygen-containing liquid fluorine at low temperatures leads to the chemical combination of fluorine and the oxygen as dioxygen difluoride, and that fluorine of reduced oxygen content is removed from the resulting product mixture in the vapor phase.

DESCRIPTION OF PREFERRED EMBODIMENTS

The present invention contemplates subjecting a liquid mixture of fluorine and oxygen to the influence of energetic radiation to effect conversion of at least a portion of the fluorine and at least a portion of the oxygen to dioxygen difluoride, i.e., $O_2F_2$. The process involves a stoichiometric reaction of equimolar amounts of oxygen and fluorine and is suitably conducted in the presence of a molar excess of the fluorine. Molar ratios of fluorine to oxygen from about 19:1 to about 99:1 or higher are satisfactory.

In a particularly preferred modification of the process, energetic radiation is employed to effectively remove the relatively minor proportion of oxygen which is observed as an impurity in commercial fluorine, which amount is typically up to about 5% mole of oxygen based on total impure fluorine mixture, but more frequently up to about 3% mole on the same basis. Subjecting such a mixture to the influence of energetic radiation results in the reaction of the oxygen contaminant with a portion of the fluorine to produce dioxygen difluoride, from which unreacted fluorine of reduced oxygen content is removed in the vapor phase. It should be appreciated that in the modification wherein the process is employed for fluorine purification, the fluorine:oxygen ratio will eventually fall outside of the range set out above as the fluorine approaches high purity. However, as will be described below, the process operates efficiently, employing a reaction mixture comprising a quite minor proportion of oxygen.

The radiation suitable for use in the present process is highly energetic, that is, is capable of producing excitation and/or ionization during passage through the reaction mixture. Radiation of sufficiently high energy is radiation of at least about 0.5 mev. (million electron volts) and preferably of at least 1 mev., although energy of more than about 3 mev. offers little additional advantage. Illustrative of such radiation is the gamma radiation produced by use of certain radioactive isotopes such as cobalt 60, or the bremsstrahlung produced when a heavy metal target is bombarded with the electron beam of a Van de Graaff accelerator. Sources of radiation of this energy are well known in the art.

The total dosage needed to effect reaction will vary, depending in part on the molar concentration of the oxygen in the fluorine and also to a great extent on the general efficiency of the reaction system. Dosage is typically measured in megarads, one megarad being equal to $10^6$ rads, where a rad is defined as 100 ergs of ionizing energy absorbed per gram of the irradiated mixture. Typical dosages are of the order of from about 1,000 megarads to about 100,000 megarads per mole of oxygen present in the mixture. The dose rate utilized is not critical and rates from about 0.25 megarad per hour to about 200 megarads per hour are satisfactory.

The process is conducted, in one modification, by a batch procedure wherein the mixture to be irradiated is charged to a cell or suitable reactor having a window transparent to the radiation if the cell itself is not transparent to the radiation. In an alternate modification, the reaction mixture is irradiated in a continuous procedure as by passing the reaction mixture through a conduit at least a portion of which is transparent to the radiation. The reactor is suitably conducted of stainless steel or of inorganic oxide materials, e.g., alumina, which are inert to the reaction mixture and the energetic radiation at the reaction temperature employed.

Suitable reaction conditions are those whereunder both the oxygen and fluorine reactants are maintained substantially entirely in the liquid phase. The optimum reaction temperature will, of course, vary with the pressure as higher reaction temperatures may be utilized if sufficient pressure is employed to maintain the reaction mixture in the liquid phase. A substantial advantage of the present process resides in its ability to effect reaction at or about autogenous pressure, that is, pressures generated by the reactants in a sealed reactor at reaction temperature, which pressures are from about 0.1 atmosphere to about 4 atmospheres. At such pressures, reaction temperatures from about 60° K. to about 110° K. are satisfactory.

Subsequent to the irradiation, the unreacted fluorine or oxygen is separated from the product dioxygen difluoride in the vapor phase. In practice, the separation is most easily accomplished by allowing the product mixture to warm to a temperature at which the product dioxygen difluoride remains a solid but at which oxygen or fluorine is gaseous. At the typical reaction pressures described hereinabove, separation temperatures of about 100° K. to about 130° K. are suitable. By way of illustration, subsequent to irradiation of an oxygen-fluorine mixture at approximately 77° K. and 250 mm., allowing the product mixture to warm to about 110° K. results in the volatilization of gaseous unreacted starting material whereas the product dioxygen difluoride remains as a solid.

In most instances, substantially complete reaction of the oxygen is accomplished by a single irradiation. In the modification wherein the process is utilized to effect fluorine purification, however, several irradiations are occasionally required to remove the last traces of oxygen contaminant. In such an instance, the procedure of irradiating the liquid oxygen-containing mixture and separating the fluorine of reduced oxygen content from the resulting product mixture in the vapor phase is repeated until the desired degree of fluorine purity is obtained.

The product dioxygen difluoride is a brown solid, stable at temperatures up to about 188° K., which is useful as a chemical intermediate in the formation of high energy oxidizers for the oxidization of hydrocarbons. Grosse et al., U.S. 3,320,031, issued May 16, 1967, describe the conversion of dioxygen difluoride to dioxygen chlorine trifluoride, useful as an oxidizer of hydrocarbons, as is also described in U.S. 3,320,031.

To further illustrate the improved process of the invention, the following examples are provided. It should be understood that the details thereof are not to be regarded as limitations, as they may be varied as will be understood by one skilled in this art.

EXAMPLE I

High intensity 2–3 mev. bremsstrahlung (up to 100 megarads per hour) were generated by directing a 3 mev. electron beam from a Van de Graaff accelerator onto a water-cooled gold target. The vertical electron beam was deflected 90°, producing a horizontal beam in order to facilitate sample placement.

To an evacuated 8 mm. I.D. stainless steel tube maintained at 770 K. was charged 32 millimoles (mmoles) of commercial fluorine containing 0.38 mmole of oxygen. The liquid sample was irradiated at 77° K. with 3 mev. bremsstrahlung at a dose rate of 100 megarads per hour for 0.25 hour. Following the irradiation, the unreacted fluorine was distilled at a temperature below 110° K. into a second vessel cooled to 77° K. repeatedly removing the cooling bath of liquid nitrogen surrounding the irradiated vessel for 10 seconds and then replacing it. The dioxygen difluoride remained as a solid in the irradiated vessel. During a first irradiation, 0.36 mmole of the oxygen was removed from the fluorine. The remaining 0.02 mmole was removed in a second irradiation conducted in a like manner.

EXAMPLE II

To a 2.5 cm. I.D. stainless steel tube maintained at 77° K. was charged 213 mmoles of liquid fluorine containing 2.23 mmoles of oxygen. The procedure of Example I was followed in irradiating the sample at 77° K. with 3 mev. bremsstrahlung at a dose rate of 50 megarads per hour for 0.5 hour. A first irradiation removed 1.75 mmoles of oxygen and the remaining 0.48 mmole of oxygen was removed in a second irradiation.

EXAMPLE III

The procedure of Example I was repeated except that the source of radiation was a 0.5 megarad per hour colbalt-60 source. The irradiation time was 10 hours so that the total dose per irradiation was 5 megarads. The first irradiation removed 0.21 mmole of oxygen from the fluorine sample, the second irradiation removed 0.11 mmole of oxygen and the third irradiation removed the remaining 0.04 mmole.

We claim as our invention:

1. The process of purifying impure fluorine containing up to about 5% mole, based on the total impure fluorine, of elemental oxygen as an impurity which comprises subjecting a liquid mixture of said fluorine and said oxygen at a temperature of from about 60° K. to about 110° K. to energetic radiation of at least 0.5 mev. for a time sufficient to convert at least a portion of said oxygen and a portion of said fluorine to dioxygen difluoride, and removing fluorine of reduced oxygen content from said dioxygen difluoride in the vapor phase by heating at a temperature in the range of above 110° K. and below 188° K.

2. The process of claim 1 wherein said radiation is of at least 1 mev.

3. The process of producing dioxygen difluoride which comprises subjecting a liquid mixture of oxygen and fluorine wherein the molar ratio of fluorine to oxygen is from about 19:1 to about 99:1 to energetic radiation of at least 0.5 mev. to a dosage of from about 1,000 megarads to about 100,000 megarads per mole of oxygen at a temperature of from about 60° K. to about 110 K. and removing any unreacted fluorine from the resulting product mixture in the vapor phase by heating at a temperature in the range of above 110° K. and below 188° K.

References Cited

UNITED STATES PATENTS

| | | | |
|---|---|---|---|
| 2,898,277 | 8/1959 | Harteck et al. | 204—157.1 |
| 3,201,337 | 8/1965 | Eichelberget et al. | 204—157.1 |
| 3,282,750 | 11/1966 | Hemstreet | 204—157.1 |

HOWARD S. WILLIAMS, Primary Examiner